United States Patent [19]

Smith et al.

[11] 4,090,540
[45] May 23, 1978

[54] TREE CUTTING APPARATUS

[76] Inventors: Dale A. Smith, 724 Main St., Mount Vernon, Ill. 62864; Cyril Barton, R.R. 1, Waltonville, Ill. 62894

[21] Appl. No.: 725,455

[22] Filed: Sep. 22, 1976

[51] Int. Cl.² .......................................... A01G 23/08
[52] U.S. Cl. .................................. 144/34 R; 30/379; 83/471.2; 83/743; 83/928
[58] Field of Search ...................... 83/471.2, 483, 485, 83/743, 928; 30/379, 379.5, 341, 373; 144/34 R, 312, 309 AC

[56] References Cited

U.S. PATENT DOCUMENTS

| 892,895 | 7/1908 | Rose | 144/34 R |
|---|---|---|---|
| 2,378,554 | 6/1945 | Irwin, Jr. | 83/743 |
| 2,462,314 | 2/1949 | Fuqua | 144/34 A |
| 2,474,037 | 6/1949 | Cuthrell | 144/193 R |
| 2,664,925 | 1/1954 | Jacobs et al. | 144/34 R |
| 2,672,171 | 3/1954 | Jones | 30/379 |
| 2,695,041 | 11/1954 | Tourneau | 83/928 |

Primary Examiner—Othell M. Simpson
Assistant Examiner—W. D. Bray
Attorney, Agent, or Firm—Bacon & Thomas

[57] ABSTRACT

A framework mounted on a tractor has separate vertically adjustable feet to support it from the ground at a desired angle of tilt so that a circular saw, slidable on the frame and driven from the tractor, can be moved downwardly and forwardly to sever a tree along a slanting plane below ground level. The frame has a member engageable with a side of the tree to resist the tendency of the frame to move laterally due to reaction from the cutting load on the saw. A hydraulic motor advances the saw while the tractor remains stationary.

6 Claims, 6 Drawing Figures

TREE CUTTING APPARATUS

BACKGROUND OF THE INVENTION

This invention is in the field of vehicle mounted power saws particularly adapted for felling trees.

Tractors or the like have heretofore been provided with circular saws driven from a power take-off of the vehicle and intended for felling trees. In all such devices known to applicant, it was necessary to cut the tree at a level substantially above ground. U.S. Pat. Nos. 2,462,314, 2,560,641, 2,601,366, 2,603,249 and 2,667,902 disclose saws on the ends of laterally swinging booms. U.S. Pat. Nos. 1,414,319, 2,542,952 and 2,597,395 show saws journalled on tractor-mounted members slidable along a frame to project the saw into a tree. None of the above patents, however, shows an arrangement where the saw can sever a tree below ground level and each of them relies on the stability of the tractor itself to accurately control movements of the saw.

SUMMARY OF THE INVENTION

The present invention provides a power driven saw guided along a frame which in turn has means for stably supporting the same directly on the ground at a selected angle of tilt so that the saw may be projected downwardly at an angle to cut a tree below ground level. The frame is connected to a tractor which supplies power for the saw and may be lifted from the ground for transport by the tractor.

DESCRIPTION OF A PREFERRED EMBODIMENT

Figure 1:
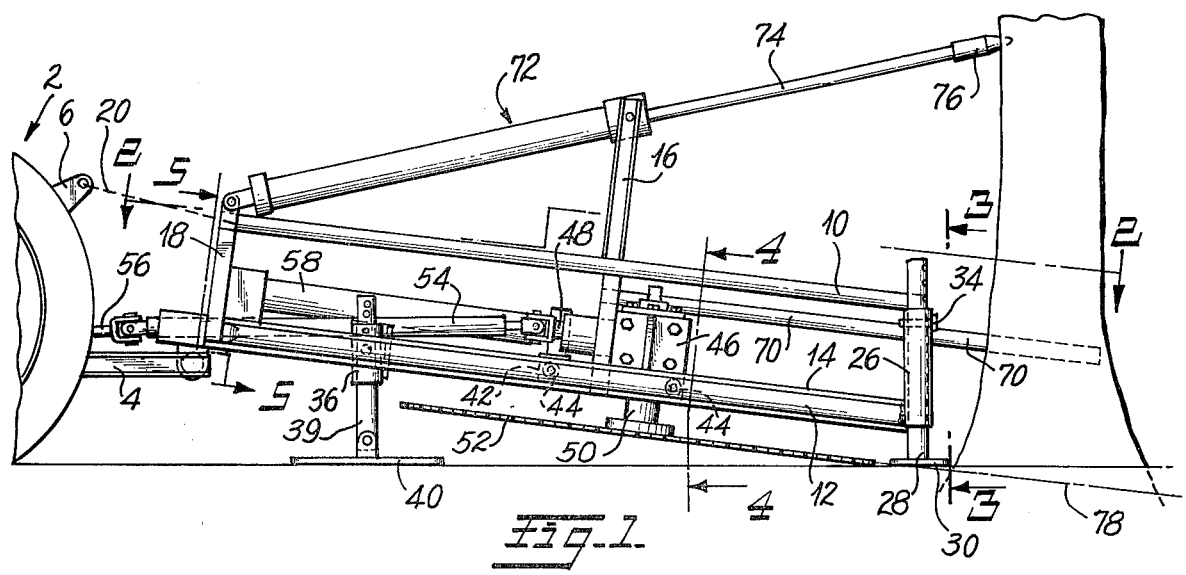
FIG. 1 is a fragmentary side elevational view of the tree cutting apparatus of the present invention.
Figure 2:
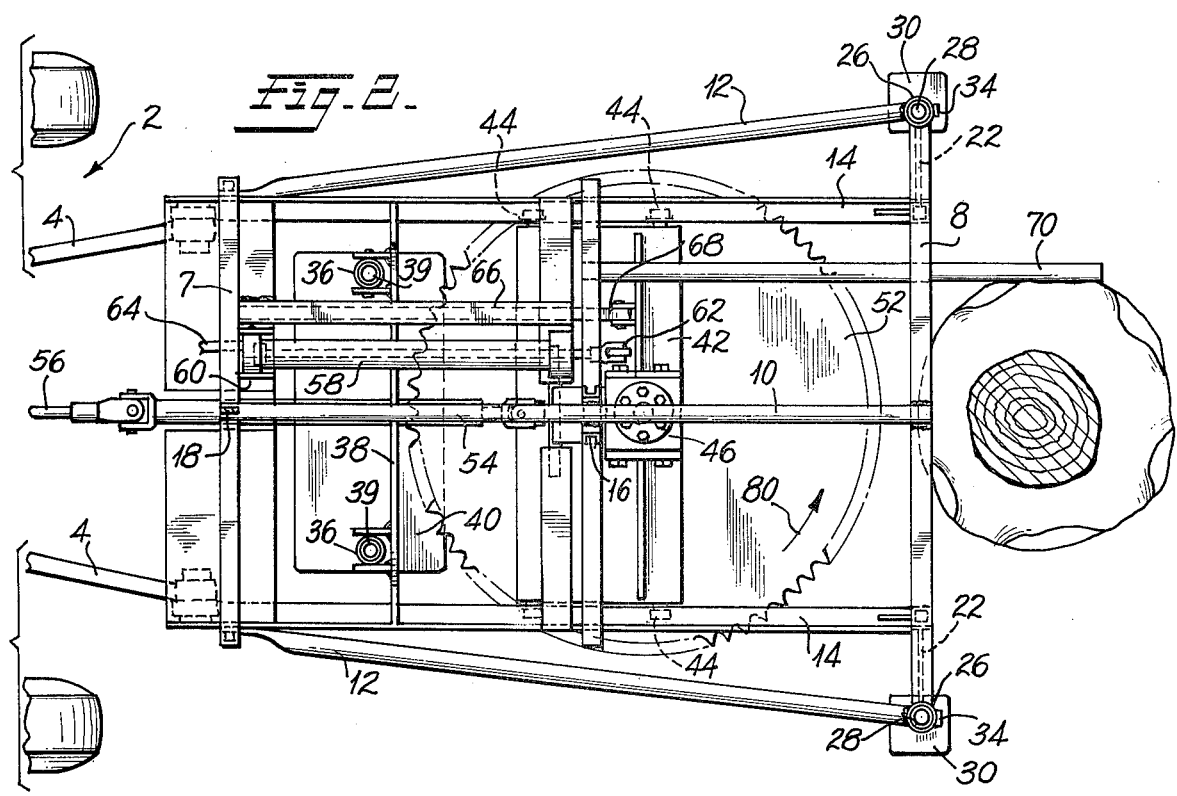
FIG. 2 is a fragmentary plan view of the apparatus of FIG. 1, partly in section, taken substantially on the line 2—2 thereof.

In FIGS. 1 and 2, numeral 2 generally designates a tractor, fragmentarily shown, having the usual implement hitch links 4 and a lifting lever 6. The links 4 and lever 6 are illustrated merely by way of example since other types of tractor or vehicle having suitable hitch features may be employed.

Figure 3:
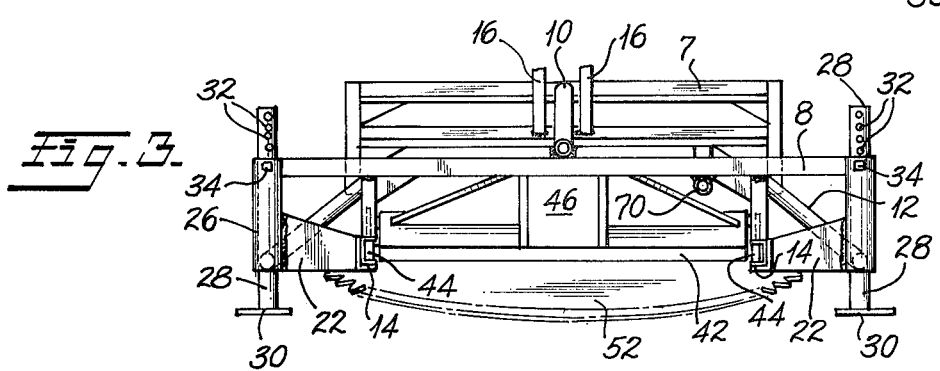
FIG. 3 is a right front elevational view, as seen on the line 3—3 of FIG. 1 with the outline of the tractor being omitted for purposes of clarity.
Figure 4:
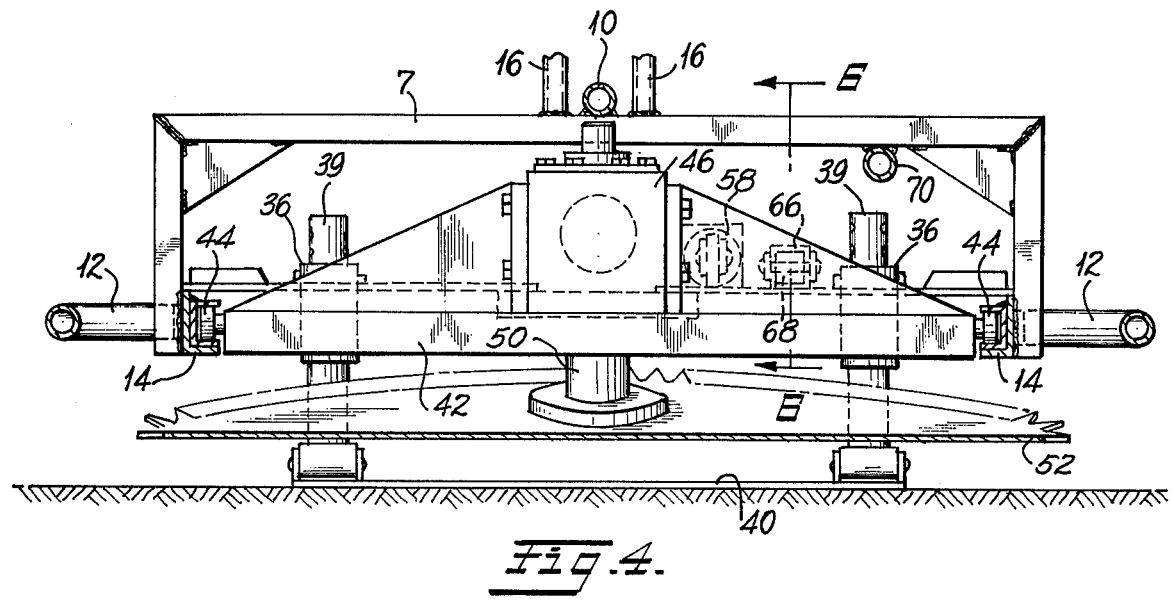
FIG. 4 is an enlarged fragmentary transverse vertical sectional view, taken on the line 4—4 of FIG. 1.
Figure 5:
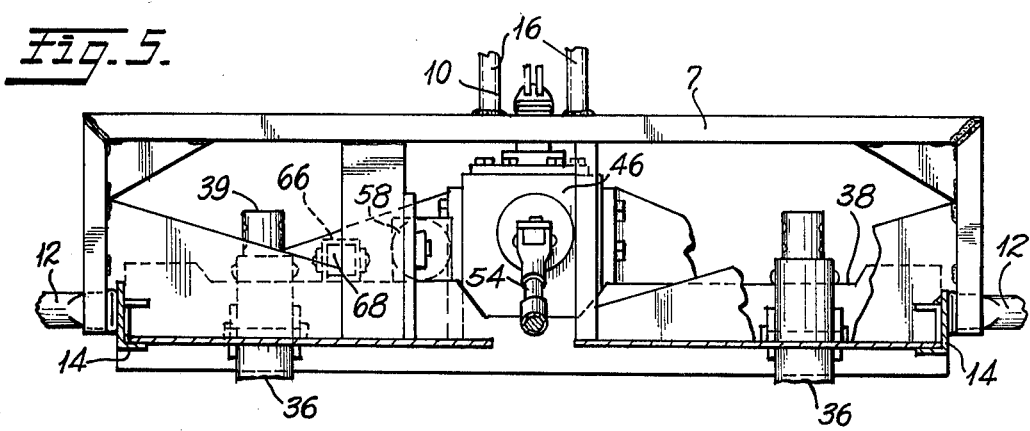
FIG. 5 is a fragmentary transverse vertical sectional view, taken on the line 5—5 of FIG. 1.

Pivotally connected to the links 4 is a framework comprising transverse frame members 7 and 8, a longitudinal brace member 10, outer frame members 12, and longitudinal members 14. The members 14 are in the form of parallel inwardly facing channels, as best seen in FIGS. 4 and 5. The frame of the apparatus further includes upstanding members 16 and 18 (FIG. 1) to which the base member 10 is secured. Numeral 20 represents schematically a chain or other tension member connected to the lift arm 6 and to the frame member 18 whereby the implement may be pivoted about its connection with links 4, by power from the tractor, to lift the same from the ground for transport. The forward ends of the channels 14 are secured to plates 22 (FIG. 3) which in turn are rigidly fixed to upstanding tubular guides 26 to the upper ends of which frame member 8 is secured, thus defining a rigid framework. The tubular guides 26 each slidably receive legs 28 having foot pads 30 at the bottom thereof adapted to rest upon the ground. The legs 28 each have a plurality of openings 32 therein and a removable locking pin 34 extends through suitable openings in the guides 26 and is adapted to enter a selected one of the openings 32 to thereby permit vertical adjustment of the legs 28 to a desired height. Also pivotally secured to the frame near the rear thereof are upstanding guide tubes 36 pivotally supported by brackets extending from a further frame member 38. Similar to the guide tubes 26, the guide tubes 36 slidably receive vertically adjustable legs 38 adjustably positioned therein by the same type of openings and pins as described with reference to adjustable legs 28. A large plate-like foot member 40 is pivotally supported at the lower end of the legs 38, being pivoted to both said legs, for a purpose to be described later.

A movable carrier plate 42 is provided with supporting and guiding rollers 44 movable in the channels 14 whereby the plate 42 is guided for rectilinear movement along those channels, which constitute trackways. A suitable gear box 46 on carrier plate 42 is provided with an input shaft 48 and an output shaft 50 upon which a circular saw blade 52 is secured in a plane parallel to the plane defined by members 14. Thus, rotation of the shaft 48 causes rotation of the saw blade 52. A telescopic drive shaft 54, of known construction, is connected to the shaft 48 and is provided with means at its rear end for drivingly connecting the same to a power output or power take-off shaft 56 of the tractor 2. Thus, the saw 52 may be driven in rotation irrespective of the position of carrier plate 42 along trackways 14 and irrespective of movement of the carrier along those tracks.

To effect movement of the carrier 42 along trackways 14, there is provided a hydraulic motor device 58 comprising a cylinder secured to the frame at 60, and having a piston rod connected to the carrier plate 42 at 62. Such hydraulic motors are well known and need not be further described except to point out that fluid under pressure may be directed thereto through a conduit 64 adapted to be connected to a source of fluid pressure on the tractor 2. It is contemplated that suitable controls (not shown) will be provided to effect control of the flow of pressure fluid to the hydraulic motor.

Figure 6:
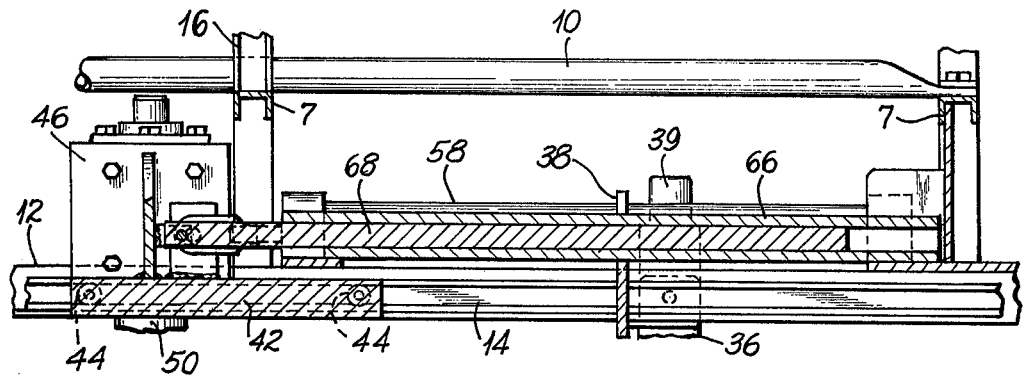
FIG. 6 is a fragmentary longitudinal vertical sectional view, taken on the line 6—6 of FIG. 4.

To ensure that the carrier plate 42 moves only rectilinearly without tilting or canting in the trackways, there is provided a guide structure comprising a fixed tubular guide 66, best shown in FIG. 6, rigidly fixed to the frame and slidably and guidingly receiving a guide bar 68 secured to the carrier 42.

Also fixed to the frame of the apparatus is a forwardly extending bar 70 projecting forwardly of the front of the front frame member 8 laterally offset from the center of saw blade 52, for a purpose to be described. It is to be noted that the legs 28 at the front of the apparatus, are spaced apart a distance greater than the diameter of the circular saw blade 52 so that the carrier plate 42 may be moved completely to the front of the apparatus and the saw blade may then pass between legs 28.

It is also contemplated that an extensible hydraulic device 72 (see FIG. 1) be mounted on the apparatus as shown and positioned to direct a piston rod 74 toward a tree to be felled. The forward end of the piston rod 74 is provided with a tree engaging member 76 and when a tree is being felled, the device 72 may be operated to enforce falling of the tree in a direction away from the apparatus.

As shown in FIG. 1, the legs 28 and 38 are so adjusted that the trackways 14 extend forwardly and downwardly at an angle. It is to be noted that the feet 30 and 40 rest directly upon the surface of the ground and thus support the frame of the apparatus in a stable position irrespective of the contour of the ground. When the frame is in operative position, the elements 4 and 6 of the tractor are, of course, manipulated so that the ground supports the entire weight of the cutting apparatus. As shown in FIG. 1, the frame is so tilted that the line of movement of the saw blade 52 extends downwardly at such an angle as to project the saw blade into the tree at or slightly below ground level and as the saw is advanced forwardly by hydraulic motor 58 along the line 78. Thus, the tree is severed without leaving unsightly stumps. Even though the motor of the tractor is operating to provide fluid pressure and power through telescopic shaft 54, tractor vibrations or possible movement or shifting of the tractor has no adverse effect upon movement of the saw blade since the latter is controlled by the framework resting directly on the ground. It is considered important that the saw blade be moved precisely along a straight line path to prevent binding when the tree is being cut and to prolong the life of the teeth thereon.

The rigid rod member 70 previously referred to is positioned laterally on the center line of the apparatus, as shown in FIG. 2, and projects forwardly sufficiently far to engage a side of the tree being cut. Arrow 80 of FIG. 2 indicates the direction of rotation of the saw blade 52 and it is obvious that when the saw enters the tree and begins to cut considerable peripheral load is placed on the saw and the frame would tend to move downwardly as seen in FIG. 2. The member 70 engaging the side of the tree prevents the reaction due to the load on the saw from moving the frame laterally.

While a single specific embodiment of the invention has been shown and described herein, the same is merely illustrative of the principles involved and other embodiments may be resorted to within the scope of the appended claims.

We claim:

1. Tree cutting apparatus comprising:
   a rigid frame having means at one end thereof for attachment to a powered vehicle;
   a trackway extending longitudinally of said frame;
   a carrier movable along said trackway and having a circular saw journalled thereon for rotation in a plane below said frame and trackway whereby said saw is movable to project its periphery beyond the other end of said frame;
   at least three vertically adjustable ground-engaging supports on said frame adjacent the ends thereof enabling said frame to be positioned stably on the ground to tilt at a selected angle extending downwardly toward said other end whereby said trackway directs said saw to engage a tree at ground level and sever said tree along an inclined cut below ground level, said vertically adjustable supports including separately adjustable supports including separately adjustable legs on opposite sides of said frame at said other end, said legs being spaced apart a distance greater than the diameter of said saw;
   means for rotating said saw concurrently with its movement along said trackway; and
   means for advancing said carrier and saw along said trackway toward said other end of said frame to project said saw between said supports and past said other end of said frame.

2. Apparatus as defined in claim 1 wherein said trackway comprises laterally spaced tracks on said frame, said carrier having opposed followers movable along each of said tracks, and rigid telescoping means connecting said carrier to said frame and arranged to hold said carrier in predetermined orientation during its movement along said trackway.

3. Apparatus as defined in claim 1 wherein said vertically adjustable supports include a pair of vertically adjustable legs adjacent said one end of said frame and a ground engaging plate member pivoted to the lower end of said leg members on a transverse axis.

4. Apparatus as defined in claim 3 wherein said leg members are pivoted to said frame on transverse axes.

5. Apparatus as defined in claim 1 wherein said means for rotating said saw comprises a telescopic drive shaft having means thereon for drivingly connecting the same to a power take-off on said vehicle.

6. Apparatus as defined in claim 1 wherein said means for advancing said carrier comprises a hydraulic motor and means for supplying said motor with pressurized fluid from a source thereof on said vehicle.

* * * * *